(12) United States Patent
Schwab et al.

(10) Patent No.: US 12,181,068 B2
(45) Date of Patent: Dec. 31, 2024

(54) SOLENOID VALVE

(71) Applicant: Buerkert Werke GmbH & Co. KG, Ingelfingen (DE)

(72) Inventors: Holger Schwab, Ingelfingen (DE); Florian Fischer, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 0 days.

(21) Appl. No.: 18/125,009

(22) Filed: Mar. 22, 2023

(65) Prior Publication Data
US 2023/0313905 A1 Oct. 5, 2023

(30) Foreign Application Priority Data
Mar. 29, 2022 (DE) .................... 10 2022 107 395.5

(51) Int. Cl.
F16K 31/06 (2006.01)
F16K 31/10 (2006.01)

(52) U.S. Cl.
CPC .......... F16K 31/0682 (2013.01); F16K 31/10 (2013.01)

(58) Field of Classification Search
CPC .... F16K 31/0682; F16K 31/10; F16K 11/044; F16K 27/0236; F16K 41/103
See application file for complete search history.

(56) References Cited

U.S. PATENT DOCUMENTS

| 3,420,494 | A | * | 1/1969 | Egner | F16K 31/0682 251/335.1 |
| 4,285,497 | A | * | 8/1981 | Gottel | F16K 31/105 137/625.65 |
| 8,302,933 | B2 | * | 11/2012 | Scheibe | F16K 31/0682 251/335.1 |
| 8,960,216 | B2 | * | 2/2015 | Clifford | F16K 31/1264 137/15.19 |
| 2023/0204115 | A1 | * | 6/2023 | Fisch | F16K 27/00 251/366 |

FOREIGN PATENT DOCUMENTS

| DE | 27 24 901 A1 | 12/1978 | |
| DE | 3528072 A1 * | 2/1987 | ......... F16K 31/0682 |
| DE | 103 15 794 A1 | 9/2004 | |

OTHER PUBLICATIONS

DE-3528072-A1 Translation (Year: 1987).*

* cited by examiner

Primary Examiner — Umashankar Venkatesan
(74) Attorney, Agent, or Firm — Dilworth IP, LLC

(57) ABSTRACT

A solenoid valve has a housing, including a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open. The diaphragm has a fastening portion which is clamped between two housing parts and by means of which the diaphragm is fastened to the housing. The diaphragm is formed from a thermoplastic and the axis of rotation runs through the fastening portion.

16 Claims, 4 Drawing Sheets

SOLENOID VALVE

TECHNICAL FIELD

The disclosure relates to a solenoid valve having a housing, which comprises a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open.

BACKGROUND

Solenoid valves having a diaphragm are known.

Such solenoid valves have a fluid chamber into which fluid channels open, and a drive chamber in which the actuator is arranged for driving the pivotable setting element so as to close one of the fluid channels opening into the fluid chamber depending on the position of the setting element. The diaphragm separates the fluid chamber from the drive chamber in a fluid-tight manner and ensures that the setting element can be pivoted. For this purpose, the diaphragm is usually formed from a flexible elastomer such as fluororubber (FKM) or ethylene propylene diene rubber (EPDM).

However, known diaphragms made of a flexible elastomer are not suitable for use at low temperatures, i.e. just above the freezing point or about 4° C., as they become brittle under these conditions and crack after a short time.

It is therefore the object to provide a solenoid valve which has a long useful life or service life at low temperatures.

SUMMARY

The object is achieved by a solenoid valve having a housing, which comprises a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open. The diaphragm has a fastening portion which is clamped between two housing parts and by means of which the diaphragm is fastened to the housing. Furthermore, the diaphragm is formed from a thermoplastic, and the axis of rotation runs through the fastening portion.

According to the disclosure, it has been recognized that a diaphragm made of a thermoplastic has high media and temperature resistance, and is thus particularly advantageous for use at low temperatures in the range of 4° C. Furthermore, it has been recognized according to the disclosure that the diaphragm can withstand a particularly high number of switching cycles without cracking if the axis of rotation passes through the fastening portion of the diaphragm. Therefore, despite the lower flexibility of thermoplastic compared to FKM or EPDM, a particularly long service life can be ensured, in particular at low temperatures. In this way, the solenoid valve according to the disclosure uses the synergistic effect of the material of the diaphragm and the arrangement of the axis of rotation.

In one embodiment, the diaphragm is formed from polyether ether ketone (PEEK).

In particular, the setting element forms a rocker arm of the solenoid valve, i.e., the solenoid valve is a rocker arm solenoid valve. Unlike other types of solenoid valves, such as rocker valves, a diaphragm made of thermoplastic in a rocker arm solenoid valve has a particularly long service life.

In one embodiment, the setting element forms a rocker arm which, together with the diaphragm, forms a latch tongue of the solenoid valve.

To ensure good sealing of the valve seat, the solenoid valve in one embodiment has a sealing element made of an elastomer, in particular perfluorocarbon rubber (FFKM), which forms a sealing surface for the valve seat.

Here, the sealing element may have an annular shape and extend circumferentially around a portion of the diaphragm, the sealing element being thus particularly effectively and precisely attached to the diaphragm.

According to one embodiment, the diaphragm further has a setting portion by means of which the diaphragm is coupled to the setting element, and a flexible portion which connects the fastening portion to the setting portion. The flexible portion has a wall thickness between 0.15 mm and 0.35 mm, in particular between 0.2 mm and 0.3 mm. The flexible portion is in particular the portion of the diaphragm which deforms elastically when the setting element is moved. As a result, the flexible portion is on the one hand thin enough to allow the setting element to be moved with little force, and on the other hand sufficiently thick to promote a long service life.

In addition, the setting portion may have a wall thickness of at least 0.4 mm, in particular at least 0.5 mm, so that the setting portion is sufficiently rigid to effectively transmit forces from the setting element to the diaphragm and thus reliably seal the valve seat.

It may further be provided that the flexible portion has a curved portion having an arcuate cross-section, particularly in the unloaded state of the diaphragm. The unloaded state here refers to a state in which the diaphragm is not mounted and not significantly deformed by external forces. This design has the advantage that the diaphragm can withstand a particularly high number of switching cycles, so that the solenoid valve has a long service life.

Here, the curved portion, as viewed in cross-section, may extend in a direction towards the actuator at least in sections beyond the axis of rotation to promote elastic deformation of the diaphragm which ensures a long service life.

In one embodiment, the fastening portion is a circumferential flange. The axis of rotation extends in particular through opposite portions of the flange or parallel to a plane in which the flange extends in the circumferential direction. In this way, the number of switching cycles for which the diaphragm is designed can be further increased.

According to a further embodiment, the housing has two opposite clamping surfaces by means of which the diaphragm is attached to the housing via the fastening portion. The solenoid valve has a sealing ring arranged between one of the clamping surfaces and the fastening portion. This ensures that the fluid chamber is separated in a fluid-tight manner from the drive chamber.

Additionally or alternatively, the housing may have a retaining plate, one of the clamping surfaces being formed at least in sections by the retaining plate. This design has the advantage that the solenoid valve can be manufactured at low cost.

Furthermore, it may be provided that the solenoid valve has a setting element support to which the setting element is attached and which is mounted in the housing for pivoting movement about the axis of rotation. In particular, the setting element support has a first bearing journal and a second bearing journal between which the diaphragm is arranged in the axial direction of the axis of rotation. In this way, the setting element support is mounted in a particularly stable manner and is thus displaced very precisely along a path during switching cycles. As a result, the diaphragm deforms in a well-defined manner during switching cycles, so that a long service life can be reliably ensured.

DETAILED DESCRIPTION

Figure 1:
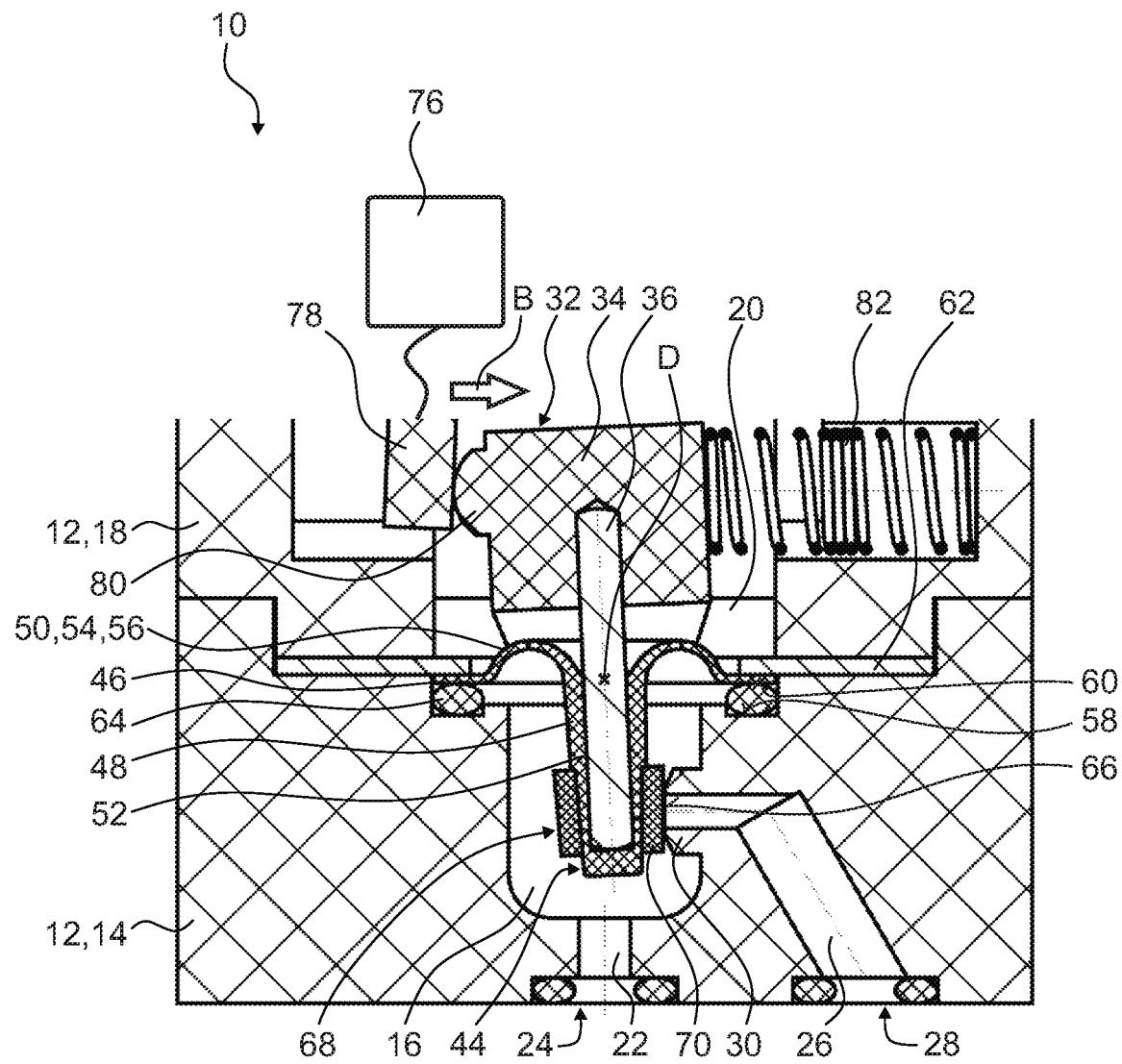
FIG. 1 shows a sectional view of a solenoid valve according to the disclosure in a position in which a valve seat of the solenoid valve is closed.

FIG. 1 shows a solenoid valve 10 with a housing 12 which includes a lower housing part 14 having an internal fluid chamber 16 and an upper housing part 18 having an internal drive chamber 20.

The lower housing part 14 has a first fluid channel 22 extending from a first fluid port 24 of the solenoid valve 10 into the fluid chamber 16 and forming an inlet or outlet for the fluid chamber 16.

Furthermore, the lower housing part 14 has a second fluid channel 26 extending from a second fluid port 28 of the solenoid valve 10 into the fluid chamber 16.

An annular valve seat 30 which surrounds the mouth of the second fluid channel 26 is formed where the second fluid channel 26 opens into the fluid chamber 16.

In the illustrated embodiment, the valve seat 30 is integrally formed with the lower housing part 14, more specifically as a protruding ring.

Therefore, the solenoid valve 10 is a 2/2-way valve.

A rocker arm 32 which is mounted for pivoting movement about an axis of rotation D relative to the housing 12 and has a setting element support 34 and a setting element 36 attached to the setting element support 34 is arranged in the drive chamber 20.

Figure 3:
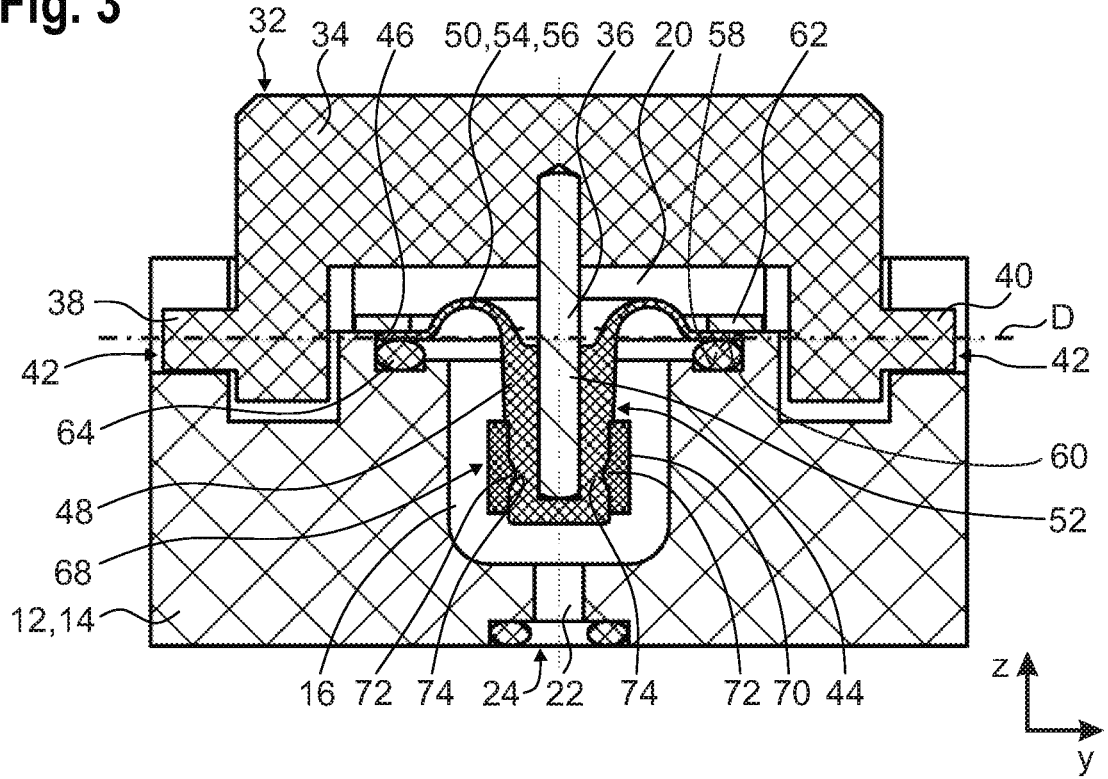
FIG. 3 shows a sectional view of the solenoid valve of FIG. 2, which is rotated by 90° compared to the sectional view of FIG. 2.

For this purpose, the setting element support 34 has a first bearing journal 38 (see FIG. 3) and a second bearing journal 40, which are mounted in correspondingly complementarily shaped bearing recesses 42 in the housing 12 for pivoting movement about the axis of rotation D.

The fluid chamber 16 is separated from the drive chamber 20 in a fluid-tight manner by a diaphragm 44, so that fluid flowing through the fluid channels 22, 26 and the fluid chamber 16 cannot enter the drive chamber 20.

The diaphragm 44 is formed from a thermoplastic, in particular polyether ether ketone (PEEK).

Figure 4:
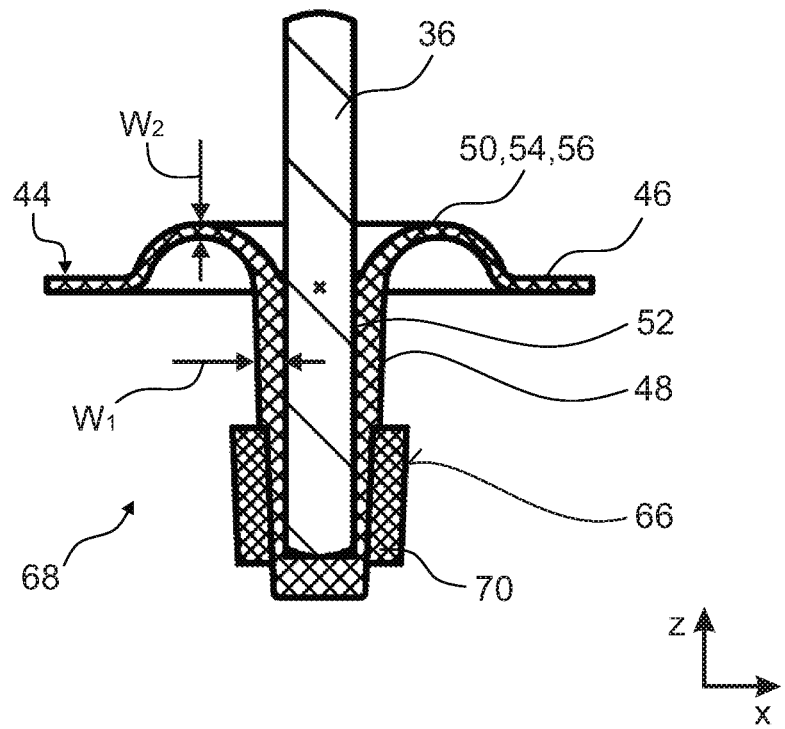
FIG. 4 shows a sectional view of a diaphragm of the solenoid valve of FIG. 1.

As shown in FIG. 4, the diaphragm 44 has a flange-shaped fastening portion 46, a central setting portion 48, and a flexible portion 50 which connects the setting portion 48 to the fastening portion 46.

The diaphragm 44 is coupled to the setting element 36 via the setting portion 48.

For this purpose, the setting portion 48 has a recess 52 in which the setting element 36 is connected in a form-fitting manner to the diaphragm 44.

In this way, the setting element 36 together with the setting portion 48 forms a latch tongue 68 of the solenoid valve 10.

In an alternative embodiment, the setting element 36 may be integrally formed with the diaphragm 44.

The setting portion 48 has a wall thickness $W_1$ of 0.55 mm.

In an alternative embodiment, the setting portion 48 may have a wall thickness $W_1$ of at least 0.4 mm, in particular at least 0.5 mm.

The flexible portion 50 forms the dynamic portion which deforms elastically when the solenoid valve 10 is moved between different positions, as will be explained below.

In this context, the flexible portion 50 has a wall thickness $W_2$ of 0.25 mm.

In an alternative embodiment, the flexible portion 50 may have a wall thickness $W_2$ between 0.15 mm and 0.35 mm, in particular between 0.2 mm and 0.3 mm.

Furthermore, the flexible portion 50 has a curved portion 54 which has an arcuate cross-section 56 when the diaphragm 44 is in the unloaded state.

The fastening portion 46 is formed as a flange which extends in the form of a band in an annular manner around the flexible portion 50 and the setting portion 48.

In the illustrated embodiment, the fastening portion 46 describes a rectangle having rounded corners.

Of course, the fastening portion 46 may have a different geometry, such as a circular or oval geometry.

The fastening portion 46 is substantially planar, that is, it extends in a plane.

The diaphragm 44 is fastened to the housing 12 via the fastening portion 46.

In the illustrated embodiment, the fastening portion 46 is clamped or locked between a first clamping surface 58 and a second clamping surface 60, which are arranged opposite each other in the vertical direction Z.

The first clamping surface 58 is formed here by the lower housing part 14, while the second clamping surface 60 is formed by a retaining plate 62 fixed between the lower housing part 14 and the upper housing part 18.

In an alternative embodiment, the second clamping surface 60 may be formed at least in sections by the upper housing part 18.

To ensure a high sealing effect, a sealing ring 64 in the form of an O-ring is arranged between the first clamping surface 58 and the fastening portion 46.

The diaphragm 44 is positioned such that the fastening portion 46 extends in a plane, which is here an X-Y plane, in which the axis of rotation D lies. That is, the axis of rotation D extends in the Y-direction (see FIG. 3) through the setting element 36 and through the fastening portion 46 on both sides of the setting element 36.

To this end, the setting element support 34 has a U-shaped cross-section in the Y-Z plane, so that the diaphragm 44 is arranged between the first bearing journal 38 and the second bearing journal 40 in the axial direction of the axis of rotation D or in the Y-direction.

Further, as seen in cross-section, the curved portion 54 extends in the vertical direction Z away from the valve seat 30 and towards the setting element support 34 beyond the axis of rotation D.

In an alternative embodiment, the curved portion 54, as seen in cross-section, extends in a direction opposite to the vertical direction Z towards the valve seat 30 and away from the setting element support 34 beyond the axis of rotation D.

In all embodiments, the setting portion 48, as seen in cross-section, extends away from the setting element support 34 beyond the axis of rotation D in a direction opposite to the vertical direction Z, so that a sealing surface 66 of the latch tongue 68 faces the valve seat 30 to open or close the latter depending on the position of the solenoid valve 10.

The sealing surface 66 is formed here by an annular sealing element 70 made of perfluorocarbon rubber (FFKM), which extends circumferentially around the setting portion 48. The sealing element 70 is only subjected to static loads and not to dynamic loads, which is still possible with FFKM even at lower temperatures.

Figure 5:
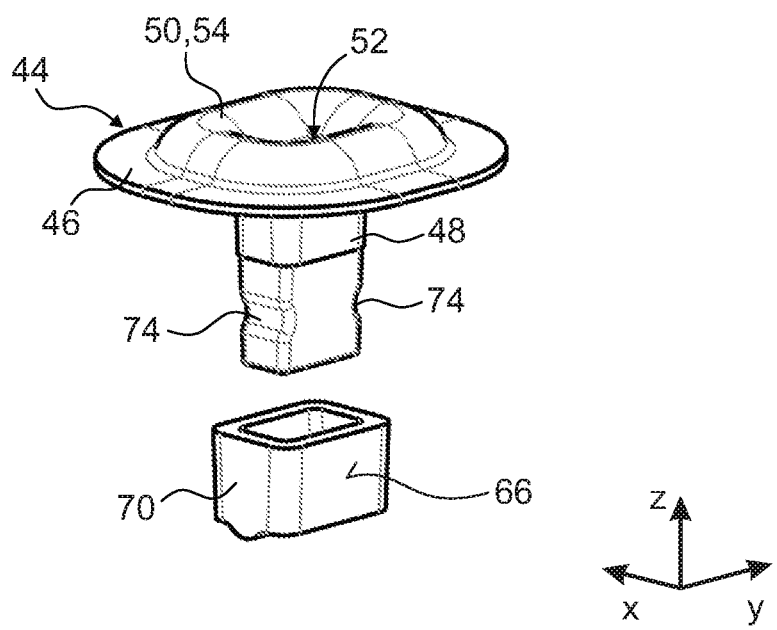
FIG. 5 shows an exploded view of the diaphragm with a sealing element of the solenoid valve of FIG. 1.

In the present embodiment, the sealing element 70 is connected in a form-fitting manner to the diaphragm 44 via latching elements 72, 74 (see FIGS. 3 and 5) and is latched therewith.

In principle, the sealing element 70 can be formed from any material, in particular any elastomer.

Additionally or alternatively, the sealing element 70 may be of any shape and/or may be attached to the diaphragm 44 in any manner, for example by an intermaterial bond.

In an alternative embodiment, the latch tongue 68 does not have a sealing element 70, i.e., the sealing surface 66 is formed by the diaphragm 44, more specifically the setting portion 48 itself.

In this case, the valve seat 30 may have an appropriate sealing element to ensure a high sealing effect.

Figure 2:
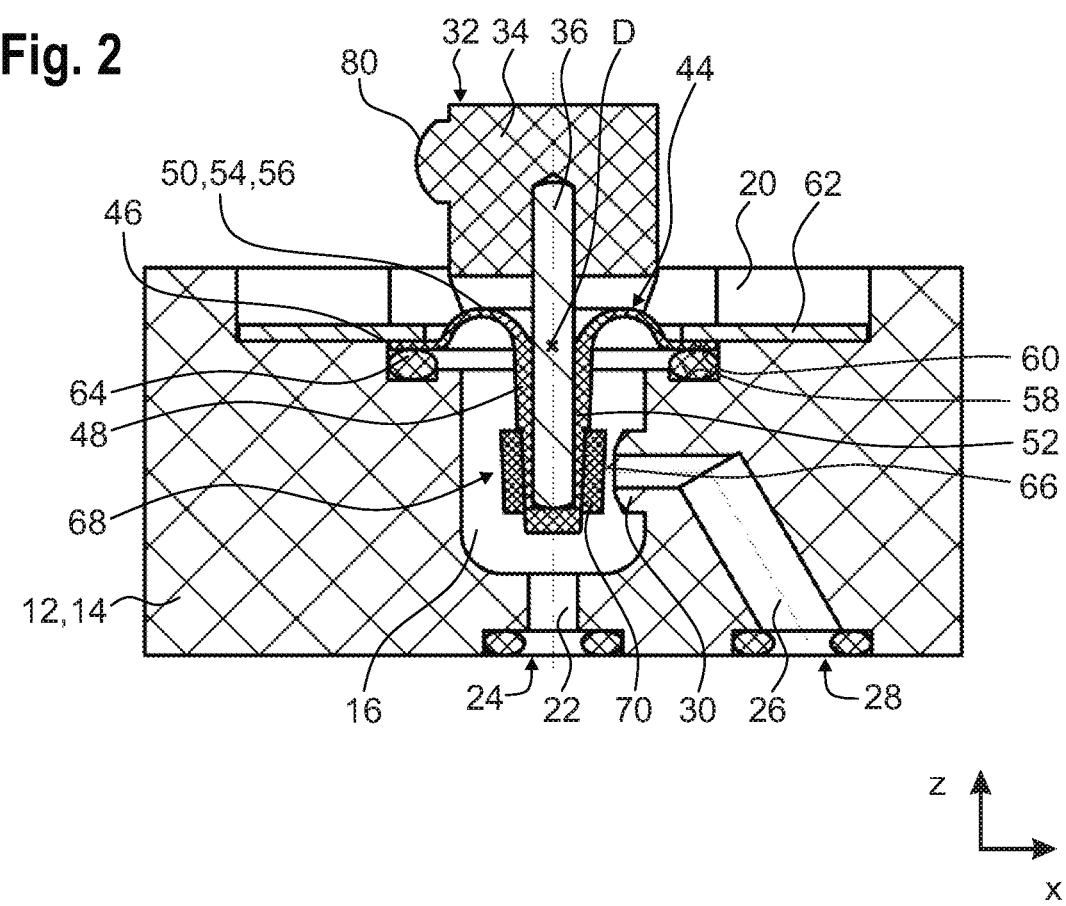
FIG. 2 shows a sectional view of the solenoid valve of FIG. 1 in a position in which the valve seat of the solenoid valve is open.

The rocker arm 32 is thus pivotable about the axis of rotation D between a first position (see FIG. 1), in which the sealing surface 66 tightly closes the valve seat 30, and a second position (see FIG. 2), in which the sealing surface 66 opens the valve seat 30 so that a fluid can flow via the valve seat 30 out of the second fluid channel 26 into the fluid chamber 16, or vice versa.

In this manner, the setting element of the solenoid valve 10 is formed by the rocker arm 32. In other words, the solenoid valve 10 is a rocker arm solenoid valve.

The solenoid valve 10 has an actuator 76 as a drive, which is set up to press the rocker arm 32 in the actuating direction B (see FIG. 1) via a stop 80 by means of an actuating element 78.

Opposite to the stop 80, a spring element 82 is arranged between the housing 12 and the rocker arm 32 and acts on or biases the rocker arm 32 in a direction opposite the actuating direction B.

In the present embodiment, the solenoid valve 10 is biased to the first position or closed position by the spring element 82 and can be displaced to the second position or open position by actuating the actuator 76. In other words, the solenoid valve 10 is a normally closed valve.

Of course, in an alternative embodiment, the solenoid valve 10 may be configured as a normally open valve.

Figure 6:
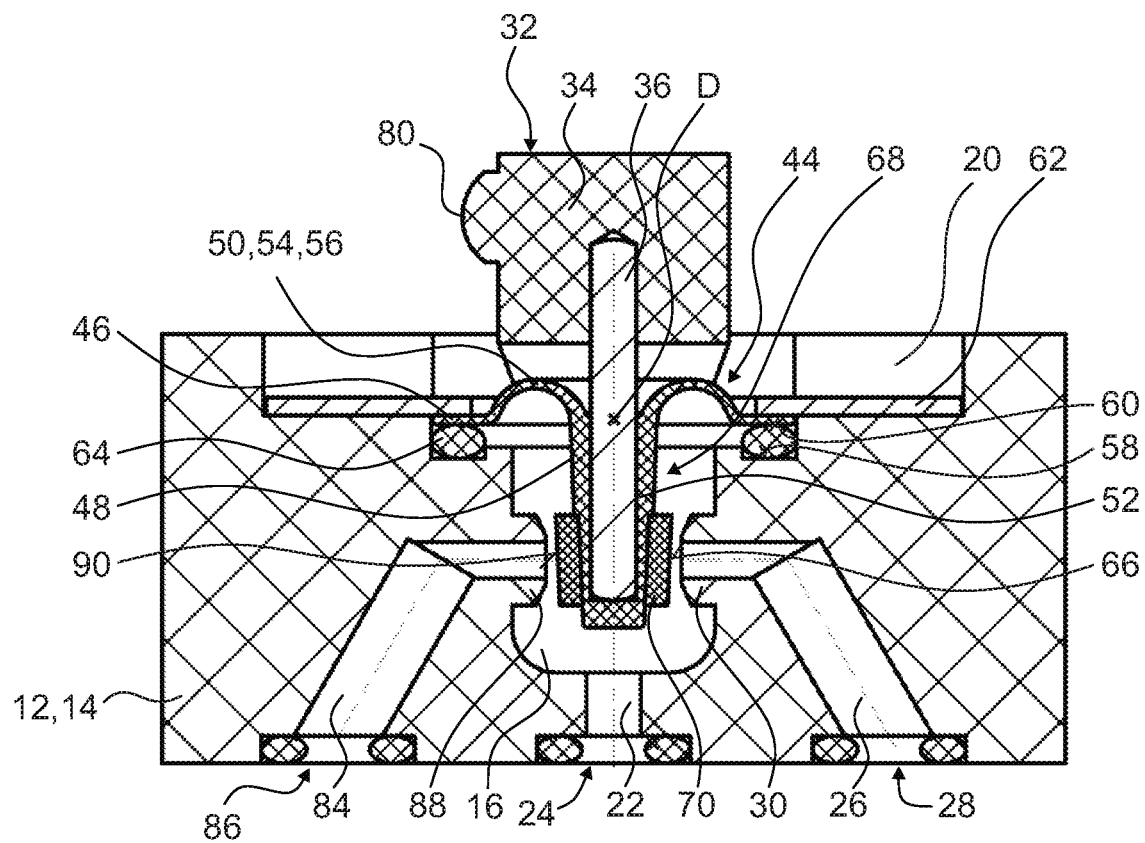
FIG. 6 shows a sectional view of a solenoid valve according to the disclosure in a further embodiment.

With reference to FIG. 6, a solenoid valve according to a second embodiment will now be described. The same reference numerals are used for the components known from the above embodiment, and reference is made in this respect to the preceding explanations.

In contrast to the embodiment shown in FIGS. 1 to 5, the solenoid valve 10 has a third fluid channel 84 extending from a third fluid port 86 of the solenoid valve 10 into the fluid chamber 16.

An annular second valve seat 88 which surrounds the mouth of the third fluid channel 84 is formed where the third fluid channel 84 opens into the fluid chamber 16.

The valve seats 30, 88 are arranged opposite each other, so that each valve seat 30, 88 can be closed by means of the latch tongue 68.

Here, the surface 90 of the sealing element 70, which is arranged opposite to the sealing surface 66 of the valve seat 30, forms a sealing surface for the valve seat 88.

Therefore, the solenoid valve 10 is a 3/2-way valve.

In this way, a solenoid valve 10 is provided which, in all embodiments, is adapted for use at low temperatures in the range of 4° C. and has a long service life under these conditions.

Further, due to the thin-walled flexible portion 50, only a small force is required to move the solenoid valve 10 between the open position and the closed position.

The disclosure is not limited to the embodiments shown. In particular, individual features of one embodiment may be combined with features of other embodiments as desired, especially independently of the other features of the corresponding embodiments.

The invention claimed is:

1. A solenoid valve having a housing, which comprises a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open, the diaphragm having a fastening portion which is clamped between two housing parts and by means of which the diaphragm is fastened to the housing, the diaphragm further has a setting portion by means of which the diaphragm is coupled to or integrally formed with the setting element, and a flexible portion which connects the fastening portion to the setting portion, wherein the diaphragm is formed from a polyether ether ketone (PEEK) thermoplastic and the axis of rotation runs through the fastening portion.

2. The solenoid valve according to claim 1, wherein the solenoid valve comprises a sealing element made of an elastomer, which forms a sealing surface for the valve seat.

3. The solenoid valve according to claim 2, wherein the sealing element has an annular shape and extends circumferentially around a portion of the diaphragm.

4. The solenoid valve according to claim 1, wherein the flexible portion has a wall thickness between 0.2 mm and 0.3 mm.

5. The solenoid valve according to claim 1, wherein the setting portion has a wall thickness of at least 0.4 mm.

6. The solenoid valve according to claim 1, wherein the flexible portion has a curved portion having an arcuate cross-section.

7. The solenoid valve according to claim 6, wherein the flexible portion has the curved portion having the arcuate cross-section in an unloaded state of the diaphragm.

8. The solenoid valve according to claim 6, wherein the curved portion, as seen in cross-section, extends in a direction towards the actuator at least in sections beyond the axis of rotation.

9. The solenoid valve according to claim 1, wherein the fastening portion is a circumferential flange.

10. The solenoid valve according to claim 1, wherein the housing has two opposite clamping surfaces by means of which the diaphragm is fixed to the housing via the fastening portion, the solenoid valve having a sealing ring arranged between one of the two opposite clamping surfaces and the fastening portion.

11. The solenoid valve according to claim 1, wherein the housing has a retaining plate, one of two clamping surfaces being formed at least in sections by the retaining plate.

12. The solenoid valve according to claim 1, wherein the solenoid valve has a setting element support to which the setting element is attached and which is mounted in the housing for pivoting movement about the axis of rotation.

13. The solenoid valve according to claim 12, wherein the setting element support has a first bearing journal and a second bearing journal between which the diaphragm is arranged in an axial direction of the axis of rotation.

14. The solenoid valve according to claim 1, wherein the setting element forms a rocker arm which, together with the diaphragm, forms a latch tongue of the solenoid valve.

15. A solenoid valve having a housing, which comprises a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open, the diaphragm having a fastening portion which is clamped between two housing parts and by means of which the diaphragm is fastened to the housing, wherein the diaphragm is formed from a polyether ether ketone (PEEK) thermoplastic and the axis of rotation runs through the fastening portion, wherein the diaphragm further has a setting portion by means of which the diaphragm is coupled to or integrally formed with the setting element and a flexible portion which connects the fastening portion to the setting portion, said flexible portion having a wall thickness between 0.15 mm and 0.35 mm.

16. A solenoid valve having a housing, which comprises a fluid chamber and a drive chamber, a diaphragm, which separates the fluid chamber from the drive chamber, an actuator and a setting element, which is mounted in the housing for pivoting movement about an axis of rotation by means of the actuator between a first position, in which a valve seat of the solenoid valve is closed, and a second position, in which the valve seat is open, the diaphragm having a fastening portion which is clamped between two housing parts and by means of which the diaphragm is fastened to the housing, the diaphragm further has a setting portion by means of which the diaphragm is coupled to or integrally formed with the setting element and a flexible portion which connects the fastening portion to the setting portion, wherein the diaphragm is formed from a polyether ether ketone (PEEK) thermoplastic and the axis of rotation runs through the fastening portion, wherein the setting element does not extend through the fastening portion.

* * * * *